United States Patent
Taylor (10) Patent No.: US 9,840,820 B2
(45) Date of Patent: *Dec. 12, 2017

(54) LIGHT ALTERING BUMPER DEVICE

(71) Applicant: Zachary Taylor, Windham, ME (US)

(72) Inventor: Zachary Taylor, Windham, ME (US)

(*) Notice: Subject to any disclaimer, the term of this patent is extended or adjusted under 35 U.S.C. 154(b) by 0 days.

This patent is subject to a terminal disclaimer.

(21) Appl. No.: 15/391,090

(22) Filed: Dec. 27, 2016

(65) Prior Publication Data

US 2017/0121923 A1 May 4, 2017

Related U.S. Application Data

(63) Continuation-in-part of application No. 14/527,147, filed on Oct. 29, 2014, now Pat. No. 9,528,238.

(51) Int. Cl.

| | |
|---|---|
| *E02B 3/26* | (2006.01) |
| *B63B 59/02* | (2006.01) |
| *B63B 45/04* | (2006.01) |
| *F21V 15/01* | (2006.01) |
| *F21V 5/04* | (2006.01) |
| F21W 111/04 | (2006.01) |
| B63B 45/02 | (2006.01) |

(52) U.S. Cl.
CPC ............ *E02B 3/26* (2013.01); *B63B 45/04* (2013.01); *B63B 59/02* (2013.01); *F21V 5/04* (2013.01); *F21V 15/01* (2013.01); *B63B 45/02* (2013.01); *F21W 2111/04* (2013.01)

(58) Field of Classification Search
CPC combination set(s) only.
See application file for complete search history.

(56) References Cited

U.S. PATENT DOCUMENTS

| | | | |
|---|---|---|---|
| 3,473,836 A | 10/1969 | Halter | |
| 5,031,564 A | 7/1991 | Beckerer, Jr. | |
| 5,836,134 A * | 11/1998 | Couto | A47B 95/043 52/288.1 |
| 6,523,986 B1 * | 2/2003 | Hoffmann | E04F 19/02 362/153 |
| 6,817,731 B2 | 11/2004 | Tufte | |
| 6,883,931 B2 | 4/2005 | Tufte | |
| 7,401,949 B2 | 7/2008 | Tufte | |
| 9,103,530 B2 | 8/2015 | Gassner et al. | |
| 9,528,238 B2 | 12/2016 | Taylor | |
| 2004/0179358 A1 | 9/2004 | Tufte | |
| 2009/0085498 A1 | 4/2009 | Condon et al. | |
| 2010/0166502 A1 | 7/2010 | DeMay | |
| 2011/0292652 A1 * | 12/2011 | Huang | F21V 5/002 362/235 |

* cited by examiner

*Primary Examiner* — Kyle Armstrong
(74) *Attorney, Agent, or Firm* — Dinsmore & Shohl LLP (57) ABSTRACT

The present invention is an integrally formed, light altering bumper designed to amplify amounts of visible light from a self-contained, integrated light source. The present invention is generally an illuminating dock bumper for attachment to either a dock or a dock vehicle made from a spine member; a lobe member; and a protective housing located within the recessed portion of the spine member for receiving an elongate light source therewithin, the light from the light source to illuminate the bumper in turn. The protective housing has a linear concave light refractor disposed thereon, the linear concave light refractor being a centrally-disposed, uniform, elongate concave depression extending along the length of the protective housing.

18 Claims, 10 Drawing Sheets

LIGHT ALTERING BUMPER DEVICE

RELATED APPLICATIONS

This Application is a Continuation-in-part of application Ser. No. 15/163,177 filed on May 24, 2016. This Application is a Continuation-in-part of application Ser. No. 14/527,147 filed on Oct. 29, 2014. Application Ser. No. 14/527,147 claims the benefit of U.S. Provisional Application 61/911,389 filed on Dec. 3, 2013. The entire contents of the above applications are hereby incorporated by reference as though fully set forth herein.

FIELD

The present invention relates to the field of dock bumpers. More specifically, the present invention relates to dock bumpers that increase visibility when docking a vehicle.

BACKGROUND

Dock bumpers are used to protect the docking vehicle, the dock, and any object it is attached to. In weather scenarios when visibility is greatly reduced such as in complete darkness, fog, and/or rain it is crucial the operator of the docking vehicle can properly see the dock in any condition.

Traditionally, docks are fitted with high powered, inefficient flood lights inundating the area with an excessive amount of light attempting to provide adequate visibility. Commonly, this lighting scenario is inadequate since these lights that produce high lumens create very dark shadows, can warp the perception of a space and will be rendered useless in inclement weather.

PRIOR ART

An application is needed were the light is emitted around the dock, outlining the dock-able face. There have been a few attempts in the prior art to meet this need, for example U.S. Pat. No. 6,095,074 to Reinhardt disclosing a boat bumper with a light for illumination. However, Reinhardt is limited to only provide light in a single direction. This directional light source limits the range in which the bumper is visible; as a result, the bumper disclosed therein can easily be missed or blocked. In addition, the bumper disclosed therein is a standard bumper with a cavernous slit running in the front where the light is to be inserted and as such the design does nothing for the light emitting towards the docking vehicle creating a harsh strip of light directly into the eyes of the operator of the docking vessel. Additionally, there is minimum protection for the light source on the front face of the bumper disclosed therein where the bumper will come into contact with the docking vessel, leaving the fundamental element, the light exposed and in a vulnerable location to be easily damaged.

Similar issues arise in the U.S. Pat. No. 7,258,472 to Tufte disclosing an illuminated bumper assembly having an elongated light source for emitting light rays and an elongated bumper for carrying the elongated light source wherein the light source is in a vulnerable location to become damaged. Due to this weakness the author proposed a bumper mounted separate from the light source in the illuminated bumper assembly. This requires additional labor to mount the bumper and light source. Additionally, the bumper will block light preventing an even distribution of light.

Marine and automotive bumpers are designed to protect the vehicle when it comes in contact with another object. A bumper on a dock is the key component in preventing damage to both, the docking vehicle and the dock. While the operator is attempting to dock it is crucial the operator can properly see both the extents of the vehicle and the outline of the dock. An illuminated dock bumper will provide ambient light to the surrounding surfaces as well as provide a clear, distinguished line of illumination around the perimeter of the dock.

BRIEF SUMMARY OF THE INVENTION

It is the object of the present invention to address several challenges in previous attempts to illuminate dock surroundings. The present invention discloses an integrally formed, light altering bumper designed to amplify amounts of visible light from a self-contained, integrated light source. The present invention is an illuminating dock bumper for attachment to either a dock or a dock vehicle, comprising generally a spine member; a lobe member, and a protective housing located within the recessed portion of the spine member for receiving an elongate light source therewithin, the light from the light source to illuminate the bumper in turn.

The light altering bumper may further comprise a light amplifying lobe that may be adjusted to direct the light source in different directions. The internal lighting source will illuminate the bumper in times of darkness, inclement weather, or low visibility. Further, this lighting source will also illuminate the top of the dock or other object that the vessel is approaching.

The light altering bumper is generally formed from a translucent (opaque), rubbery material or any other material that allows the bumper to absorb impacts while harnessing the non-visible light and creating visible light. This glowing affect will illuminate the entire perimeter of a dock or other objects it is attached to providing a clear indication of where the docking boat or other marine vessel should be docked. Since some light is still allowed to pass through the bumper, it will also help to illuminate the top of the dock or other objects it is attached to and any objects, watercrafts or otherwise, that are positioned adjacent to the bumper.

DETAILED DESCRIPTION

In the preferred embodiment of the light altering bumper of the present invention is formed from a translucent (opaque) polymer which will help to amplify the visible effects of light. Light will be reflected inside the material and diffused to create a glowing affect using indirect diffused light, such as a fluorescent tube or light emitting diode (LED). If the material was not translucent but rather something more transparent, light would pass through the bumper uninterrupted and remain invisible to the naked eye and therefore be useless.

Figure 1:
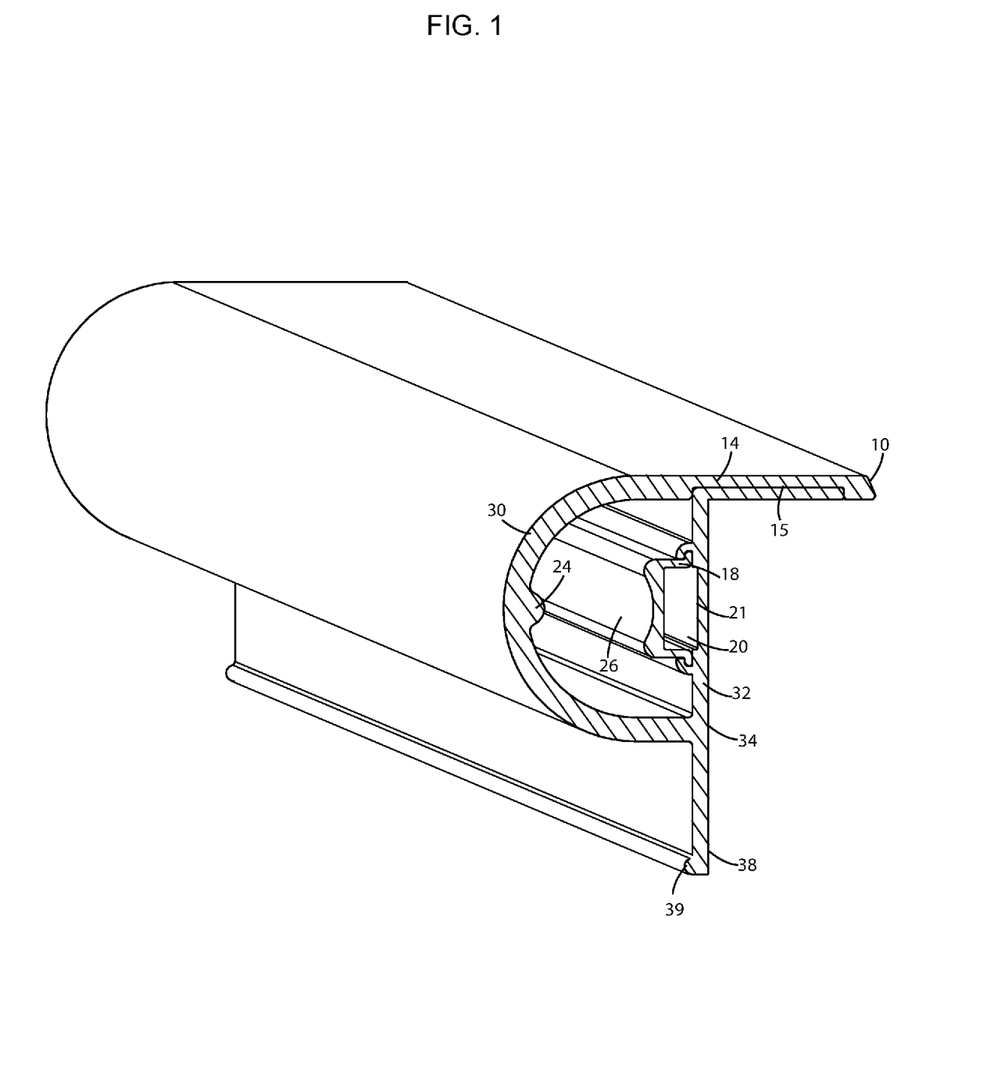
FIG. 1. Illustrates a sectional perspective of the light altering bumper of the present invention in the closed configuration.
Figure 2:
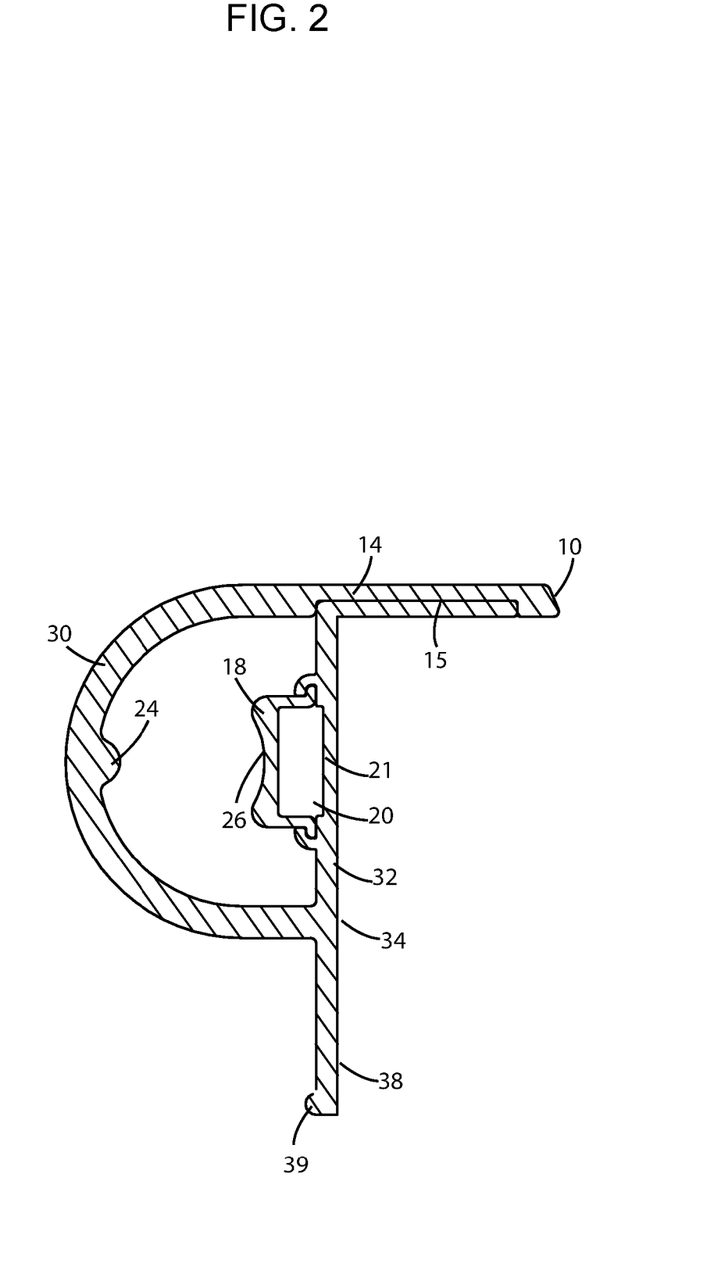
FIG. 2. Illustrates a cross section view of the light altering bumper of the present invention in the closed configuration.
Figure 9:
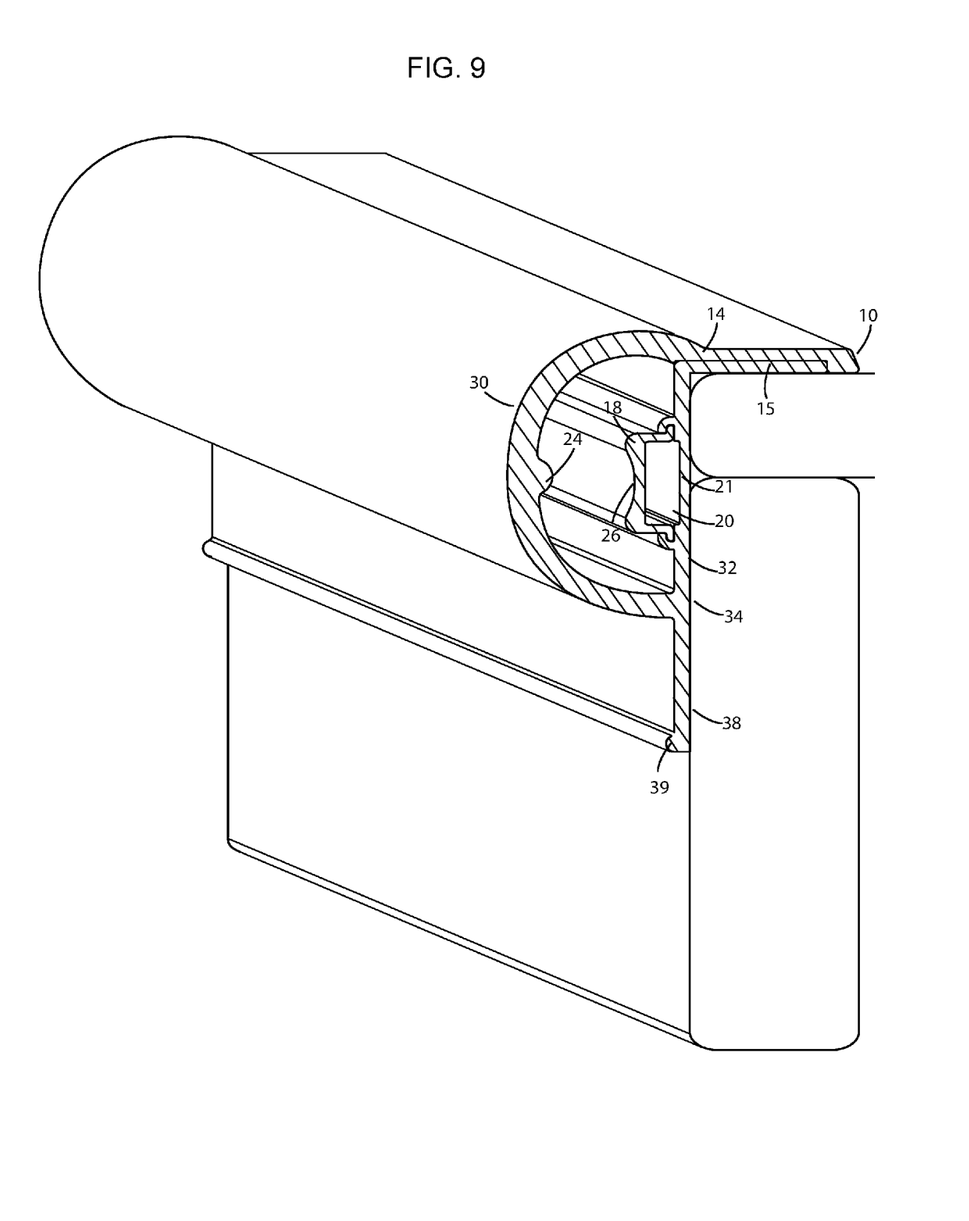
FIG. 9. Illustrates a sectional perspective of an alternative embodiment of the light altering bumper of the present invention in the closed configuration.
Figure 10:
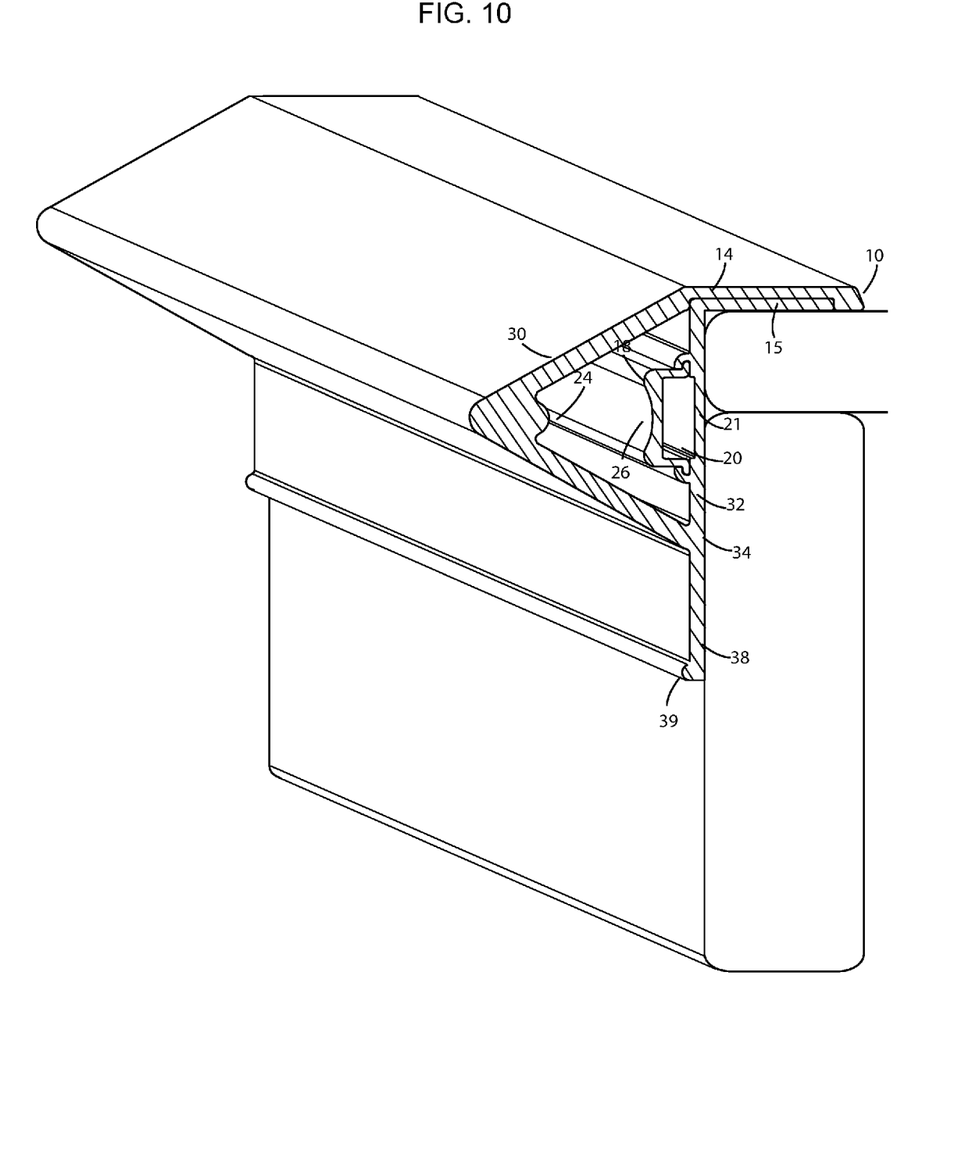
FIG. 10. Illustrates a sectional perspective of an alternative embodiment of the light altering bumper of the present invention in the closed configuration.

Turning to FIGS. 1 and 2, one embodiment of the light altering bumper of the present invention is generally constructed from an L-shaped spine member with an inner surface, outer surface, a vertical plane 32, horizontal plane 15 and a recessed portion 21 along the outer surface of the vertical plane 32 and a lobe member with an inner surface, outer surface, a first lobed portion 30 protruding perpendicularly forward from the outer surface of the vertical portion 32 of the spine member, and a second substantially planar portion 14 protruding perpendicularly backward from the inner surface of the vertical portion 15 of the spine member. In the preferred embodiment, the lobe portion 30 is a vaulted barrel cross sectional configuration. However, the lobe portion 30 may also be of a circular and/or cylindrical cross section configuration, like that shown in FIG. 9 or a triangular cross section configuration like that shown in FIG. 10. It is contemplated that a variety of lobe portion 30 shaped may be used in the present invention.

A protective housing 18 surrounds a sealed internal housing 20, which is located adjacent to the vertical plane 32 of the spine and at the mid-point opposite the lobe portion 30. The protective housing 18 comprises a linear concave light refractor 26 disposed thereon, the linear concave light refractor 26 comprising a centrally-disposed, uniform, elongate concave depression extending along the length of the protective housing.

The protective housing 18 may be opaque, using the same material or a more translucent plastic may be employed allowing for a greater amount of light to pass through to be altered. Along the inner surface of the lobe portion 30 comprises a linear bell-shaped light reflector 24 disposed thereon, the linear bell-shaped light reflector 24 comprising a backwardly-projecting, solid elongate member of uniform, substantially semi-circular cross-section; the linear bell-shaped light reflector 24 extending the length of the lobe portion 30.

As shown in FIGS. 3, 8, 9 and 10, the bumper is mounted to the dock at opposite ends of the bumper along the horizontal plane 15 of the L-shaped spine member and at the bottom end 38 of the vertical plane 32 of the L-shaped spine member.

Figure 7:
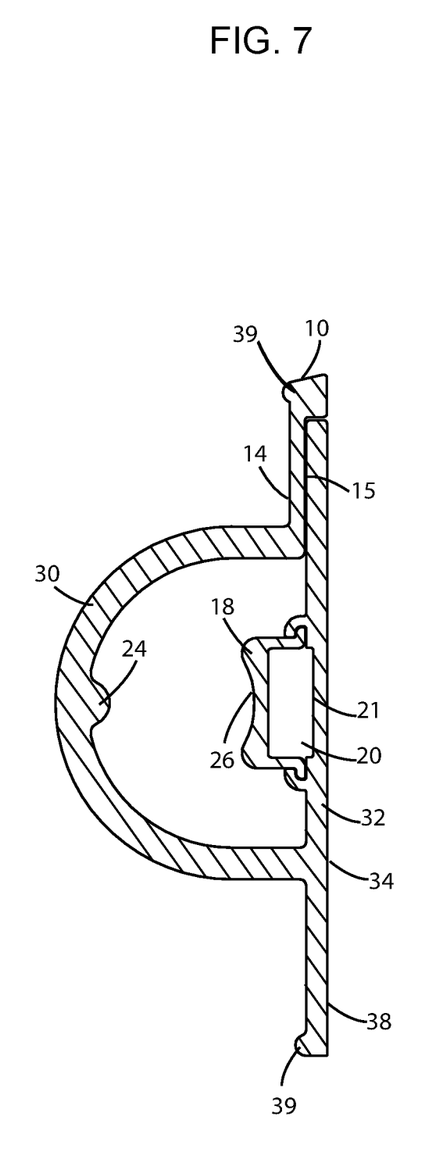
FIG. 7. Illustrates a sectional perspective of an alternative embodiment of the light altering bumper of the present invention in the closed configuration.
Figure 8:
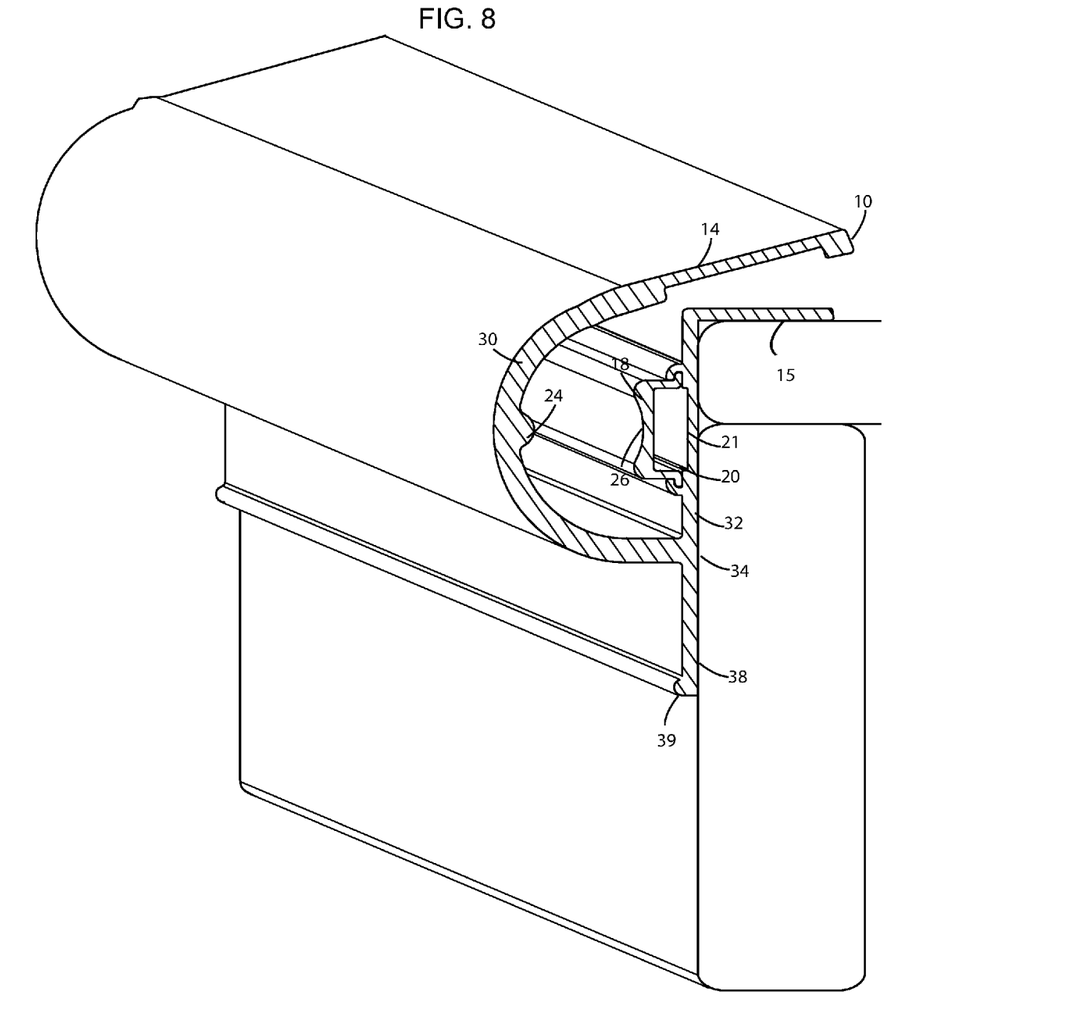
FIG. 8. Illustrates a sectional perspective of the light altering bumper of the present invention in an open configuration to allow access to the light source.

Alternatively, as shown in FIG. 7, the bumper is constructed from a substantially vertical planar spine member 32 with an inner surface, outer surface, and a recessed portion 21 along the outer surface of the spine and a lobe member with an inner surface, outer surface, a first lobed portion 30 protruding perpendicularly forward from the outer surface of the vertical plane 32 of the spine member, and a second substantially planar portion 14 protruding upward from the first lobed portion 30 and parallel to the spine member 32. The bumper is mounted to the dock at opposite ends of the bumper at the top end 15 of the spine member 32 and at the bottom end 38 of the spine member 32.

Turning back to FIG. 1, at the end of the second substantially planar portion 14 is a chamfered angle cut 10 decreasing the rate of change from the dock surface to the top of the bumper, minimizing the possibility of an individual catching an edge and tripping. A layer of a high reflective paint backing 34 may be applied to the vertical plane 32 of the spine member or alternatively part or the entire spine structure of FIG. 1 or FIG. 7 may be painted white or constructed from a solid white plastic or polymer material. In the preferred embodiment, just the recessed portion 21 of the spine is all white to help reflect light out with the remaining parts being translucent.

When the bumper comes in contact with a boat or other object, the lobe portion 30 absorbs the majority of the impact, sending the force down and up to the extremities of the spine member where the mounts are located while the spine member helps to ensure the form of the bumper during assembly and especially during an impact, thus also increasing the impact capacity of the form. As the lobe portion 30 is the primary entity in absorbing impacts and in the preferred embodiment is the thickest component of the design while the spine member can be thinner. Further, within the approximate center on the spine member is the recessed portion 21 designed to hold the light source in place while increasing the distribution of light throughout the bumper lobe portion 30. This recessed portion 21, as it is not a crucial structural component to maintain rigidity but rather a cavity to retain an object and can be reduced in thickness within the spine member. As such the lobe member, spine member, and recessed portion of the spine member 21 have a thickness ratio of about 5:3:1.

The protective housing 18 becomes a crucial member in protecting the light source. This item creates the centralized sealed internal housing 20 creating a fully protected and waterproof chamber. In the preferred embodiment, the substantially planar portion 14 of the lobe member substantially overlaps the outer surface of the vertical portion 15 of the spine member and seals the bumper in a closed configuration in a "press fir manner. This allows the light source in the internal housing 20 to be removed and replaced. Alternatively, the substantially planar portion 14 of the lobe member and the outer surface of the vertical portion 15 of the spine member may be integral with one another and the light source is removed from the opposing ends of the internal housing 20, which may be open at each end of the bumper. As show in in FIG. 8, the protective housing 18 and internal housing 20 is accessed by lifting the second substantially planar portion 14 away from the vertical portion 15 of the spine member.

Figure 3:
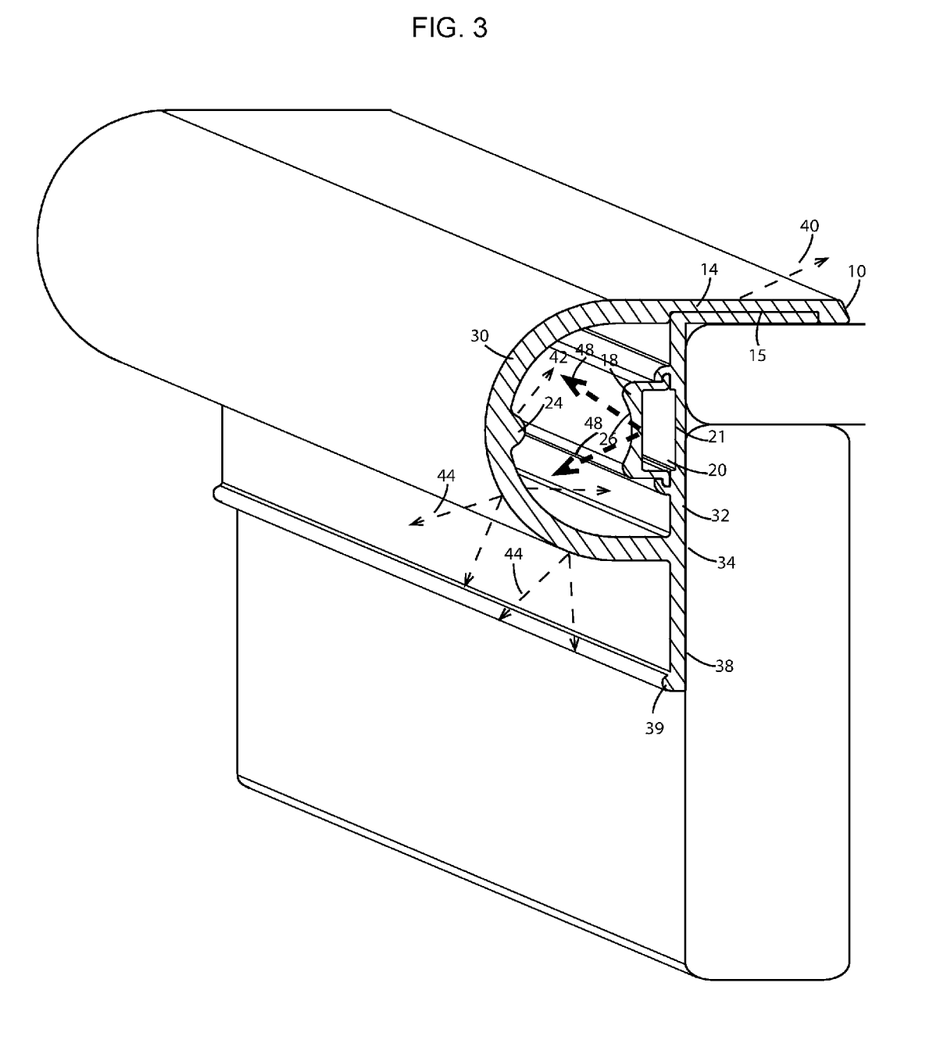
FIG. 3. Illustrates a section perspective of the light altering bumper in the closed configuration as attached to a dock.

Turning to FIG. 3, a light source is placed inside the internal housing 20. Indirect diffused light 40 is shown emanating from the light altering bumper assembly towards the object it is mounted upon, which in this case is a boat dock. Indirect reflected light 42 is reflected off the linear bell-shaped light reflector 24. Refracted diffused light 48 exits the light source and is refracted through the linear concave light refractor 26 and become further diffused as it passes through the light altering bumper material to become twice diffused light for high ambient distribution 44.

Figure 4:
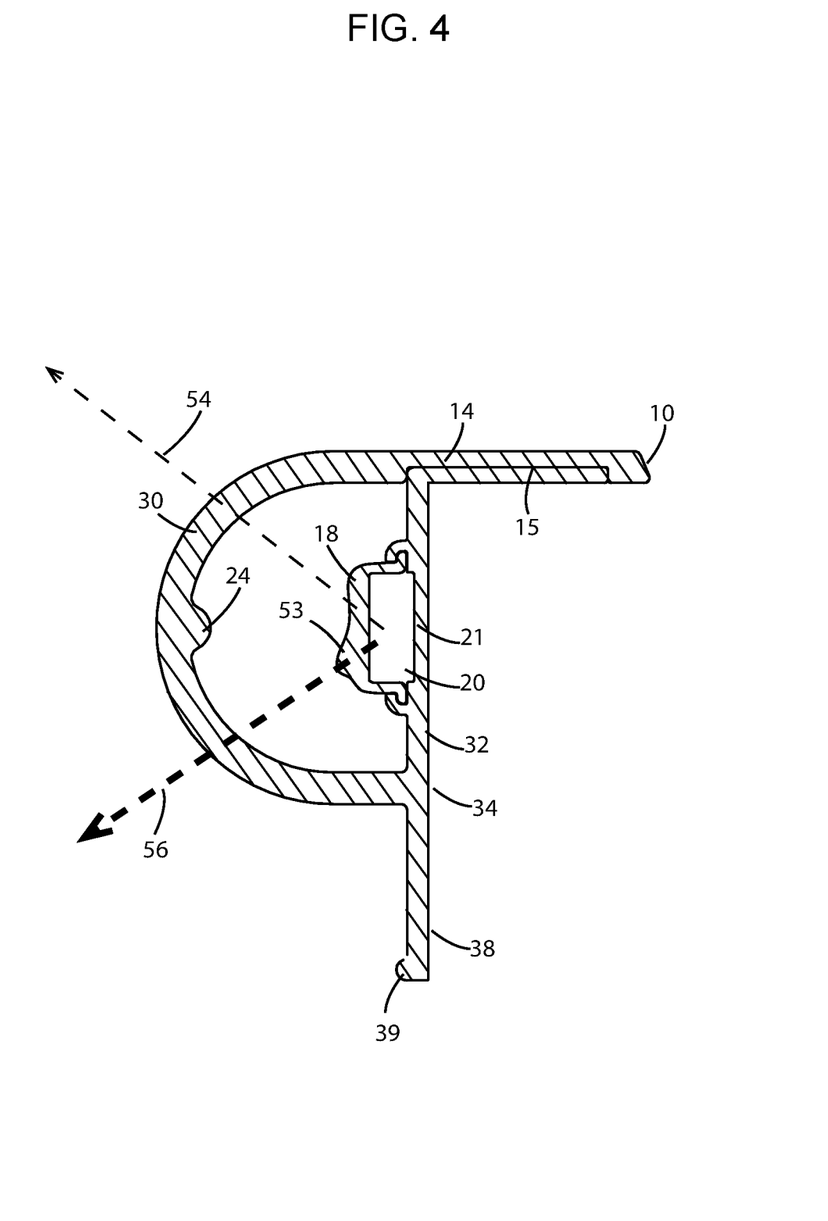
FIG. 4. Illustrates a cross sectional perspective of the light altering bumper of the present invention in the closed configuration with the light amplifying lobe embodiment with light source directed downward.
Figure 5:
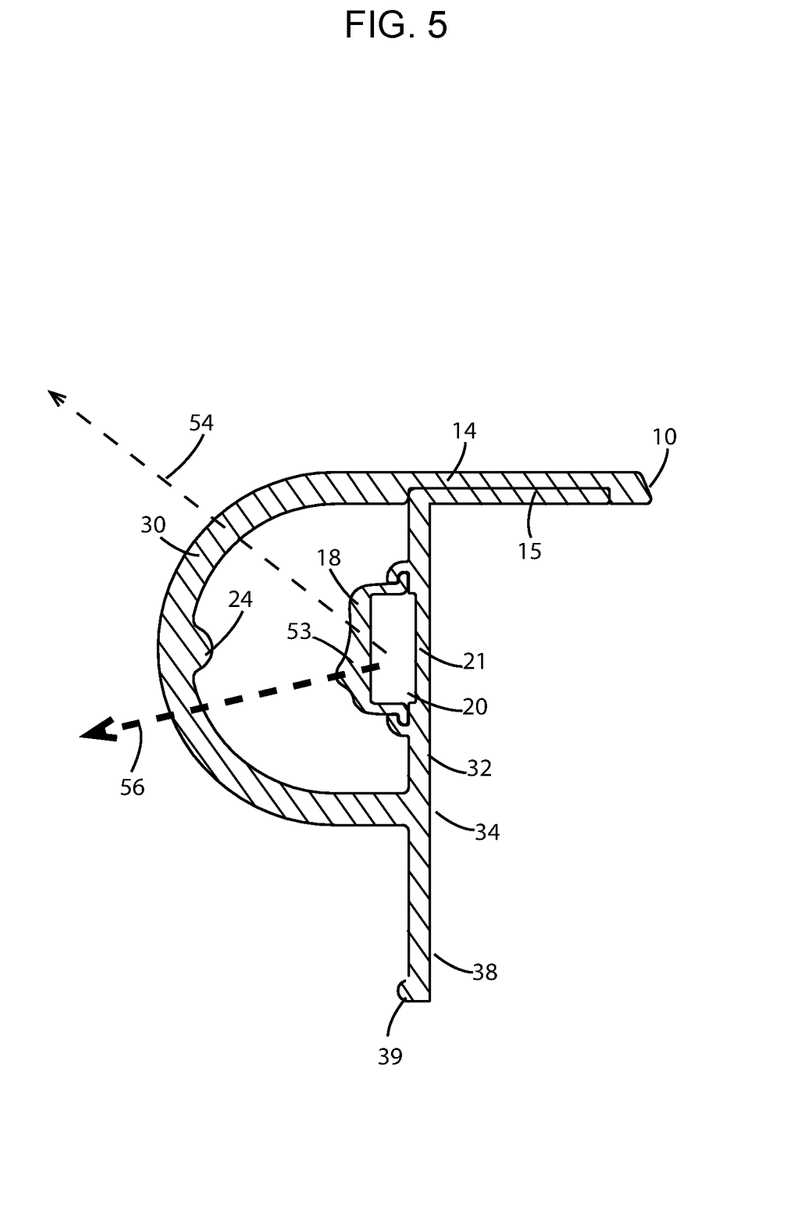
FIG. 5. Illustrates a cross sectional perspective of the light altering bumper of the present invention in the closed configuration with the light amplifying lobe embodiment with light source directed downward and out.
Figure 6:
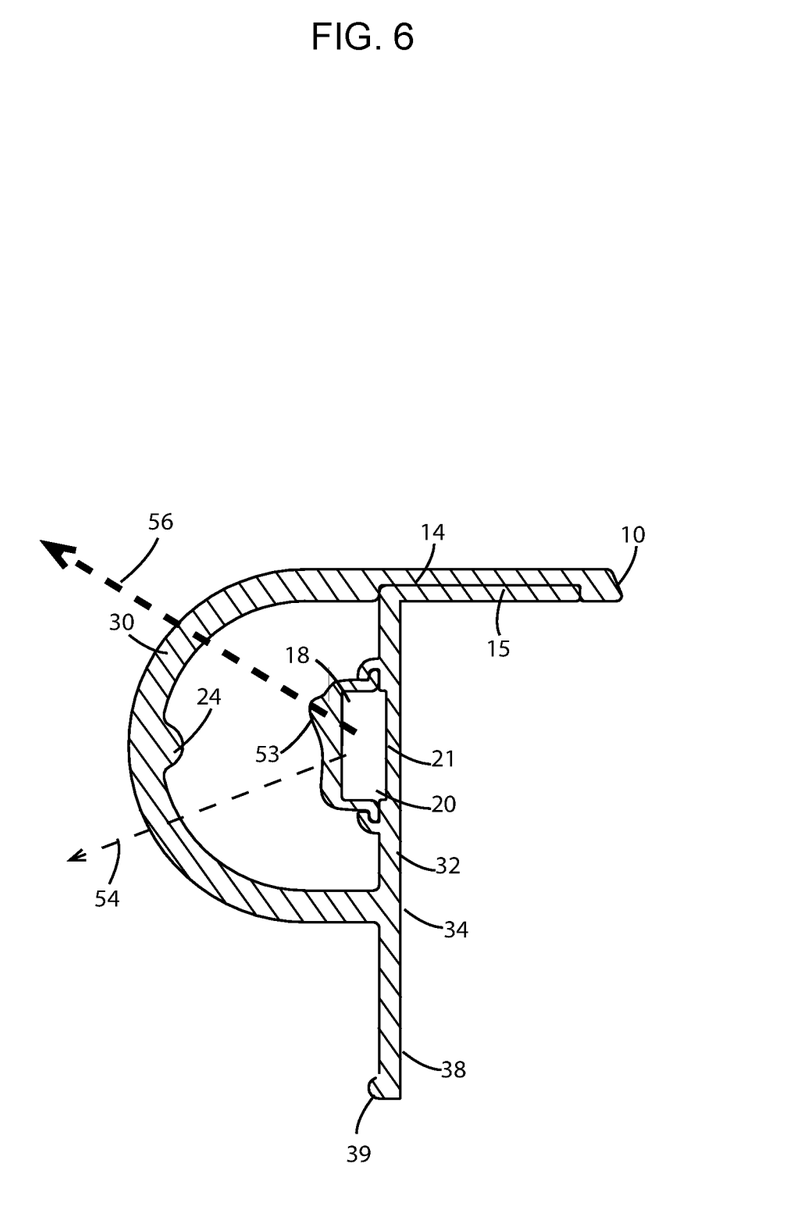
FIG. 6. Illustrates a cross sectional perspective of the light altering bumper of the present invention in the closed configuration with the light amplifying lobe embodiment with light source directed upward.

If the protective housing 18 is shaped differently than the linear concave light refractor 26 then the light source will be warped differently as seen in FIGS. 4-6. By adding a convex lobe known as the amplifying lobe 53, light will travel through the elongated lobe and become condensed much like how a magnifying glass creates a hot spot of light in the sun. Doing this, an intense beam of light can be directed anywhere.

This amplifying lobe 53 is useful to provide additional light to hazardous objects that maybe located adjacent to the dock such as rocks, buoys, beaches or other docks that do not have the light altering bumper. The outer surface of the protective housing 18 comprises an amplifying lobe 53 disposed thereon, the amplifying lobe 53 comprising an outwardly-projecting, solid, elongate member of uniform substantially curvilinear cross-section, which extends along the length thereof; the amplifying lobe 53 for directing the light from the light source therethrough. The amplifying lobe 53 may be upwardly, downwardly or centrally disposed.

Turning to FIG. 4, in one embodiment of the present invention, the amplifying lobe 53 is placed along the protective housing 18 such that the condensed Light 56 is primarily directed downward. Alternatively, as shown in FIG. 5, the amplifying lobe 53 can be placed a little further upward than that shown in FIG. 4 such that the condensed light 56 is primarily directed slightly downward and mostly outward. Finally, as shown in FIG. 6, the amplifying lobe 53 can be placed even further upward that that shown in FIG. 5 such that the condensed light 56 is primarily directed slightly upward 54.

As shown in FIGS. 1-6 and 8-10, at the bottom end 38 of the vertical plane 32 of the L-shaped spine member is a small concave, semi-circular bulge 39 which protects the docking vehicle from being damaged by any mounting screws positioned through the L-shaped spine member. As shown in FIG. 7, if the spine member is planar, then a second small concave, semi-circular bulge 39 is located at the top of the second substantially planar portion 14.

The primary operation of the light altering bumper will be to protect objects such as boats, planes and cars from coming in contact with the hard surface adjacent while illuminating the object it is attached to and the surrounding area. The bumper with its dual mounting positions 14 and 38 on the spine can be attached to any flat rough or hard surface such as but not limited to marine docks, loading docks, decks, wharfs, guard rails, pilings, posts, moorings, buoys, jetties, and piers. The internal light source may have the ability to change color, frequency and brightness with the use of remote, timers, control panel or Wi-Fi device.

For the purposes of promoting an understanding of the principles of the invention, reference has been made to the preferred embodiments illustrated in the drawings, and specific language has been used to describe these embodiments. However, this specific language intends no limitation of the scope of the invention, and the invention should be construed to encompass all embodiments that would normally occur to one of ordinary skill in the art. The particular implementations shown and described herein are illustrative examples of the invention and are not intended to otherwise limit the scope of the invention in any way. For the sake of brevity, conventional aspects of the method (and components of the individual operating components of the method) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections might be present in a practical device. Moreover, no item or component is essential to the practice of the invention unless the element is specifically described as "essential" or "critical". Numerous modifications and adaptations will be readily apparent to those skilled in this art without departing from the spirit and scope of the present invention.

What is claimed is:

1. An illuminating dock bumper for attachment to either a dock or a dock vehicle, comprising:
   a. a substantially vertical planar spine member with an inner surface, outer surface, and a recessed portion along the outer surface of the spine;
   b. a lobe member with an inner surface, outer surface, a first lobed portion protruding perpendicularly forward from the outer surface of the vertical portion of the spine member, and a second substantially planar portion protruding upward from the first lobed portion and parallel to the spine member; and
   c. a protective housing located within the recessed portion of the spine member for receiving an elongate light source therewithin, the light from the light source to illuminate the bumper in turn, and extending edges of said protective housing establishing a tab and slot engagement with said spine.

2. The bumper of claim 1 wherein the second portion of the lobe member substantially overlaps the outer surface of the spine member.

3. The bumper of claim 1 wherein, the second portion of the lobe member is integral with the spine member.

4. The bumper of claim 1 wherein, the protective housing comprises a linear concave light refractor disposed thereon, the linear concave light reflector comprising a centrally-disposed, uniform, elongate concave depression extending along the length of the protective housing.

5. The bumper of claim 1 wherein, the inner surface of the lobe comprises a linear bell-shaped light reflector disposed thereon.

6. The bumper of claim 1 wherein the lobe member, spine member, and recessed portion of the spine member have a thickness ratio of about 5:3:1.

7. A combination illuminating and force absorbing bumper, comprising:
   an elongated spine adapted to being mounted to an extending receiving surface;
   a lobe integrated into said spine at a first projecting cross sectional location, said lobe extending, as viewed in cross section, in a three dimensional and reversing direction in order to establish an interior between an inside surface of said lobe and said spine;
   an illuminating source supported within said interior;
   a protective housing secured to an exterior surface of said spine for containing said illuminating source extending edges of said protective housing establishing a tab and slot engagement with said spine; and
   an extending end of said lobe releasably engaging with a receiving location of said spine for permitting said lobe to be displaced between an open condition for accessing said interior and a reclosed and latched engagement position with said spine in which said lobe provides force absorption and deflection protection both to the interiorly supported illuminating source and an exterior contacting object.

8. The bumper as described in claim 7, further comprising said lobe flexing about said spine at said first cross sectional location during displacement between said open and reclosed engagement positions.

9. The bumper as described in claim 7, said spine further comprising in cross section an end portion extending from said receiving surface.

10. The bumper as described in claim 9, said extending lobe end further comprising an underside ledge engageable with an end surface of said end portion in said engagement position.

11. The bumper as described in claim 10, said end portion of said spine further comprising an angled upper portion.

12. The bumper as described in claim 7, said protective housing and said lobe each further comprising any of a transparent or translucent construction.

13. The bumper as described in claim 7, further comprising at least one reflecting feature incorporated into said lobe for redirecting away from said bumper light from said illuminating source.

14. The bumper as described in claim 13, said reflecting feature further comprising a linear bell shape adapted to redirect light any an of an upward or downward oblique direction.

15. The bumper as described in claim 7, said lobe further comprising, in cross section, and of an arcuate or polygonal shape.

16. The bumper as described in claim 7, further comprising said spine and lobe being constructed of any plasticized or polymeric material.

17. The bumper as described in claim 7, further comprising at least one of a remote, timer, control panel or WiFi device for modifying any of a color, pulse frequency or brightness associated with an output of said illuminating source.

18. A combination illuminating and force absorbing bumper adapted to secure to an upper angled edge of a dock having a vertical face and an interconnecting horizontal face, said bumper comprising:

an elongated and "L" cross sectional shaped spine adapted to being mounted over the vertical and horizontal faces proximate the angled edge;

a light permitting lobe integrated into said spine at a first projecting cross sectional location associated with a first leg of said spine, said lobe extending, as viewed in cross section, in a three dimensional and reversing direction above a second leg of said spine and in order to establish an interior between an inside surface of said lobe and said spine;

a light refractor containing an illuminating source and secured to said spine within the lobe enclosing interior; and an extending end of said lobe exhibiting an underside and inside facing surface defining a catch with a rear facing edge of said second leg for permitting said lobe to be displaced between an open condition for accessing said interior supported illuminating source and a reclosed and latched engagement position with said spine in which said lobe provides force absorption and deflection protection both to the interiorly supported illuminating source and an exterior contacting object.

* * * * *